United States Patent
Usikov et al.

(10) Patent No.: US 12,190,155 B2
(45) Date of Patent: Jan. 7, 2025

(54) METHOD AND DEVICE FOR OPERATING A SELF-DRIVING CAR

(71) Applicant: YANDEX SELF DRIVING GROUP LLC, Moscow (RU)

(72) Inventors: Aleksandr Usikov, Minsk (BY); Andrei Valchok, Minsk (BY)

(73) Assignee: Y.E. Hub Armenia LLC, Yerevan (AM)

( * ) Notice: Subject to any disclaimer, the term of this patent is extended or adjusted under 35 U.S.C. 154(b) by 268 days.

(21) Appl. No.: 17/578,654

(22) Filed: Jan. 19, 2022

(65) Prior Publication Data
US 2022/0388531 A1    Dec. 8, 2022

(30) Foreign Application Priority Data

Jun. 8, 2021  (RU) .......................... RU2021116607

(51) Int. Cl.
*B60W 60/00* (2020.01)
*G06F 9/50* (2006.01)
*G06V 20/58* (2022.01)

(52) U.S. Cl.
CPC ........ *G06F 9/5016* (2013.01); *B60W 60/0011* (2020.02); *B60W 2554/20* (2020.02); *B60W 2554/4041* (2020.02)

(58) Field of Classification Search
CPC ..... B60W 2554/20; B60W 2554/4041; B60W 2554/40; B60W 2554/4049;
(Continued)

(56) References Cited

U.S. PATENT DOCUMENTS

| | | | |
|---|---|---|---|
| 7,639,159 | B2 | 12/2009 | McNew et al. |
| 8,121,749 | B1 | 2/2012 | Agrawal et al. |

(Continued)

FOREIGN PATENT DOCUMENTS

| | | |
|---|---|---|
| CN | 110763233 A | 2/2020 |
| CN | 111123927 A | 5/2020 |

(Continued)

OTHER PUBLICATIONS

Stahl et al. "Multilayer graph-based trajectory planning for race vehicles in dynamic scenarios." 2019 IEEE Intelligent Transportation Systems Conference (ITSC). IEEE, Oct. 27-30, 2019.
(Continued)

*Primary Examiner* — Khoi H Tran
*Assistant Examiner* — Tanner L Cullen
(74) *Attorney, Agent, or Firm* — BCF LLP

(57) ABSTRACT

A method and device for operating a Self-Driving Car (SDC) are disclosed. The device executes in real-time a first processing pipeline including generating static attributes for a plurality of potential positions of the SDC on the road segment, and caching the static attributes in association with the respective ones of the plurality of potential positions. The device executes in real-time a second processing pipeline in parallel with the first processing pipeline including generating a graph-structure for operating the SDC on the road segment. The generating the graph-structure includes generating dynamic attributes for a given edge of the graph-structure, acquiring from the cache memory static attributes for the given edge of the graph-structure, such that the given edge in the graph-structure is associated with the static attributes generated by the first processing pipeline and with the dynamic attributes generated by the second processing pipeline.

18 Claims, 8 Drawing Sheets

(58) Field of Classification Search
CPC ......... B60W 60/0027; B60W 60/0011; B60W 60/001; G01C 21/343; G01C 21/3453; G08G 1/165; G08G 1/166
See application file for complete search history.

(56) References Cited

U.S. PATENT DOCUMENTS

| | | | |
|---|---|---|---|
| 10,551,840 | B2 | 2/2020 | Zhu et al. |
| 10,725,470 | B2 | 7/2020 | Mahabadi et al. |
| 10,754,339 | B2 | 8/2020 | Zhu et al. |
| 10,816,990 | B2 | 10/2020 | Li et al. |
| 10,824,153 | B2 | 11/2020 | Zhang et al. |
| 10,990,099 | B2 | 4/2021 | Le et al. |
| 11,436,504 | B1* | 9/2022 | Lukarski ................. G06N 5/04 |
| 2015/0353085 | A1 | 12/2015 | Lee |
| 2019/0163191 | A1 | 5/2019 | Sorin et al. |
| 2019/0258737 | A1* | 8/2019 | Wang ................. G06F 16/2379 |
| 2019/0286151 | A1 | 9/2019 | Palanisamy et al. |
| 2019/0310644 | A1 | 10/2019 | Zhang |
| 2019/0317515 | A1 | 10/2019 | Zhang et al. |
| 2020/0159216 | A1 | 5/2020 | Le et al. |
| 2020/0159233 | A1 | 5/2020 | Zhang et al. |
| 2020/0182633 | A1 | 6/2020 | Liu |
| 2020/0200553 | A1 | 6/2020 | Voznesensky et al. |
| 2020/0339158 | A1 | 10/2020 | Gud et al. |
| 2020/0363814 | A1 | 11/2020 | He et al. |
| 2020/0377085 | A1* | 12/2020 | Floyd-Jones ... B60W 60/00274 |
| 2021/0213978 | A1* | 7/2021 | Edling ............ B60W 60/00274 |
| 2021/0347382 | A1* | 11/2021 | Huang ................. G05D 1/0212 |
| 2022/0136838 | A1* | 5/2022 | Yang .................... G05D 1/0274 |
| | | | 701/469 |

FOREIGN PATENT DOCUMENTS

| | | |
|---|---|---|
| CN | 111829545 A | 10/2020 |
| EP | 0297811 A2 | 1/1989 |
| RU | 2479015 C1 | 4/2013 |
| RU | 2551294 C1 | 5/2015 |
| RU | 2589869 C2 | 7/2016 |

OTHER PUBLICATIONS

European Search Report dated Jul. 21, 2022 issued in respect of the European Patent Application No. 22155068.4.

Russian Search Report dated Dec. 9, 2022 issued in respect of the counterpart Russian Patent Application No. RU 2021116607.

* cited by examiner

METHOD AND DEVICE FOR OPERATING A SELF-DRIVING CAR

CROSS-REFERENCE

The present application claims priority to Russian Patent Application No. 2021116607, entitled "Method and Device for Operating a Self-Driving Car", filed Jun. 8, 2021, the entirety of which is incorporated herein by reference.

TECHNICAL FIELD

The present technology relates generally to Self Driving Cars (SDCs); and in particular, to an electronic device for and method of operating a SDC.

BACKGROUND

Self-Driving Cars (SDCs) are vehicles that are able to autonomously drive themselves through private and/or public spaces. Using a system of sensors that detects the location and/or surroundings of the SDC, logic within or associated with the SDC controls the speed, propulsion, braking, and steering of the SDC based on the sensor-detected location and surroundings of the SDC. For example, a computer system can leverage sensor data for generating future trajectories for the SDC on a road segment and can control operation of the SDC so that it follows a selected trajectory on the road segment.

One of the main technical challenges in implementing the above systems is the ability for the computer system to detect an object potentially present around the vehicle—such as a vehicle in front of the present vehicle (the present vehicle being the SDC having the computer system onboard), which vehicle in front may pose a risk/danger to the present vehicle and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

Typically, the SDC has a plurality of sensors to enable the SDC to capture and "understand" its surround area. A variety of sensor systems may be used by the SDC, such as but not limited to camera systems, radar systems, and LIDAR systems. Different sensor systems may be employed for capturing different information, and/or in different format, about the location and the surroundings of the SDC. For example, camera systems may be used for capturing image data about the surroundings of the SDC. In another example, LIDAR systems may be used to capture point cloud data for building 3D map representations of the surroundings and other potential objects located in proximity to the SDC.

It is generally known for the SDC to process data captured by such the plurality of sensors to generate a prediction, typically using a Machine Learning Algorithm (MLA) in regard to presence of one or more objects in the vicinity of the SDC. Such the prediction can then be used by the SDC to determine the most optimal current maneuver, be it to continue driving, stop, change direction, accelerate, or the like.

U.S. Pat. No. 8,121,749 discloses methods and systems of controlling an autonomous vehicle. A method comprises controlling operations of the vehicle based at least in part on edge costs. An edge is a representation of a path the vehicle can traverse. Edge costs are determined by an estimation system and are based on at least one of an estimated travel time for an edge and a traverse-ability of the edge. The method further comprises sensing conditions of edges the vehicle is traversing and based on the sensed conditions, dynamically updating the edge costs.

SUMMARY

There is a need for systems and methods that avoid, reduce or overcome the limitations of the prior art. It should be noted that generation of data for controlling operation of a Self-Driving Car (SDC), such as trajectory data, for example, may require a graph-structure of a road segment on which the SDC is currently operating. For instance, an electronic device may be configured to generate a graph-structure representative of respective potential positions and potential transitions for the SDC on a road segment. The electronic device may determine a given sequence of edges in the graph-structure which (i) is associated with an acceptable total cost of edges in the sequence, and (ii) is representative of a potential path that the SDC should follow on the road segment. The electronic device may then generate trajectory data for the SDC to actually follow that path on the road segment.

Generation of the graph-structure for the road segment is a computationally expensive operation, which can take a considerable amount of time. This is due to the fact that the electronic device needs to compute a plurality of attributes for respective edges of the graph-structure.

In the context of the present technology, an electronic device is configured to compute at least two types of attributes for edges of a graph-structure, namely "static" and "dynamic" attributes. Broadly speaking, a given static attribute is indicative of information about a static object on the road segment relative to a respective edge (and/or one or more potential positions associated with the edge), while a given dynamic attribute is indicative of information about a moving object on the road segment relative to the respective edge (and/or one or more potential positions associated with the edge).

It should be noted that static attributes of a given edge are less likely to change in time if compared to dynamic attributes of the given edge. For example, a distance between a potential position on the road segment and a static object is likely to stay the same, whereas a distance between that potential position and a moving object is likely to change.

Developers of the present technology have devised an electronic device that is configured to parallelize the generation processes of static and dynamic attributes. In other words, it is contemplated that an electronic device may be configured to execute, on the one hand, a main processing pipeline for generating dynamic attributes for edges of a graph-structure, and on the other hand, a support (parallel) processing pipeline for generating static attributes for edges of the graph-structure.

Developers of the present technology have realized that so-excluding computation of static attributes from the main processing pipeline, and in a sense "offloading" this computation to the parallel support processing pipeline, allows reducing the computational time required for generating graph-structures during respective planning cycles of a self-driving vehicle. Increasing the computational speed of graph-structure results in quicker decision-making capabilities during operation of the self-driving vehicle.

In a first broad aspect of the present technology, there is provided a method of operating a Self-Driving Car (SDC) on a road segment. The SDC travels on the road segment. The SDC is controlled by an electronic device. The method executable by the electronic device. The method comprises executing, in real-time by the electronic device, a first processing pipeline. The executing the first processing pipeline comprises generating, by the electronic device, static attributes for a plurality of potential positions of the SDC on the road segment. A given static attribute is indicative of information about a static object on the road segment relative to a respective potential position. The executing the first processing pipeline comprises caching, by the electronic device in a cache memory, the static attributes in association with the respective ones of the plurality of potential positions. The method comprises executing, in real-time by the electronic device, a second processing pipeline in parallel with the first processing pipeline. The executing the second processing pipeline comprises generating, by the electronic device, a graph-structure for operating the SDC on the road segment. The graph-structure has nodes and edges. A given node being associated with a respective potential position of the SDC on the road segment. A given edge being representative of a transition of the SDC between potential positions of the respective pair of nodes and associated with a respective set of intermediate potential positions between the potential positions of the respective pair of nodes. The generating the graph-structure comprises generating, by the electronic device, dynamic attributes for a given edge of the graph-structure. A given dynamic attribute is indicative of information about a moving object on the road segment relative to a respective one of a respective set of intermediate potential positions. The generating the graph-structure comprises acquiring, by the electronic device from the cache memory, static attributes for the given edge of the graph-structure. The static attributes for the given edge including the static attributes cached in association with the respective set of intermediate potential positions, and such that the given edge in the graph-structure is associated with the static attributes generated by the first processing pipeline and with the dynamic attributes generated by the second processing pipeline.

In some embodiments of the method, the graph-structure is a first graph-structure, and the generating the first graph-structure is for operating the SDC on the road segment during a first time interval, and the executing the second processing pipeline further comprises generating, by the electronic device, a second graph-structure for operating the SDC on the road segment during a second time interval. The second graph-structure has the given edge of the first graph-structure. The generating the second graph-structure comprises generating, by the electronic device, updated dynamic attributes for the given edge. A given updated dynamic attribute is indicative of updated information about the moving object on the road segment relative to the respective one of the respective set of intermediate potential positions. The generating the second graph-structure comprises acquiring, by the electronic device from the cache memory, the static attributes for the given edge, such that the given edge in the second graph-structure is associated with the static attributes generated by the first processing pipeline and with the updated dynamic attributes generated by the second processing pipeline.

In some embodiments of the method, the generating the static attributes for the plurality of potential positions of the SDC on the road segment is performed at a first moment in time, and wherein the executing the first processing pipeline further comprises generating, by the electronic device, updated static attributes for the plurality of potential positions at a second moment in time, the first moment in time and the second moment in time defining a third time interval. A length of the third time interval being pre-selected based on a length of at least one of the first time interval and the second time interval for reducing processing resources of the electronic device required for executing the first processing pipeline.

In some embodiments of the method, the generating the static attributes for the plurality of potential positions comprises applying, by the electronic device, a prioritization logic for determining an order of potential positions for which the static attributes are to be generated in the first processing pipeline.

In some embodiments of the method, the plurality of potential positions includes a pre-selected number of potential positions, and the caching the static attributes is triggered once the static attributes are generated for the pre-selected number of potential positions.

In some embodiments of the method, the generating the static attributes for the plurality of potential positions of the SDC on the road segment of the first processing pipeline is executed asynchronously with the generating the dynamic attributes for the given edge of the graph-structure of the second processing pipeline.

In some embodiments of the method, the given dynamic attribute of the respective edge is one of: a distance between a given one of the respective set of intermediate potential positions and a position of an other moving vehicle on the road segment, a distance between the given one of the respective set of intermediate potential positions and a position of a moving pedestrian on the road segment, and a distance between the given one of the respective set of intermediate potential positions and a position of a moving cyclist on the road segment.

In some embodiments of the method, the given static attribute of the respective edge is one of: a distance between a given one of the respective set of intermediate potential positions and a position of a road cone on the road segment, a distance between the given one of the respective set of intermediate potential positions and a position of a stop sign on the road segment, a distance between the given one of the respective set of intermediate potential positions and a position of a lane on the road segment, and a distance between a given one of the respective set of intermediate potential positions and a position of a lane center of the lane on the road segment.

In some embodiments of the method, the method further comprises causing, by the electronic device, operation of the SDC on the road segment based on the graph-structure. The causing comprises determining, by the electronic device, a cost of the given edge in the graph-structure based on the respective static and dynamic attributes. The causing comprises determining, by the electronic device, a sequence of edges in the graph-structure representative of a potential path for the SDC on the road segment. The sequence of edges includes the given edge and is associated with an acceptable total cost of edges in the sequence. The causing comprises generating, by the electronic device, a given trajectory for the SDC on the road segment based on the sequence of edges. The causing comprises causing, by the electronic device, operation of the SDC for travelling on the road segment in accordance with the given trajectory.

In some embodiments of the method, the method further comprises causing, by the electronic device, operation of the SDC on the road segment during the second time interval based on the second graph-structure. The causing comprises determining, by the electronic device, a cost of the given edge in the second graph-structure based on the respective static and updated dynamic attributes. The causing comprises determining, by the electronic device, a sequence of edges in the second graph-structure representative of a potential path for the SDC on the road segment. The sequence of edges includes the given edge and is associated with an acceptable total cost of edges in the sequence. The causing comprises generating, by the electronic device, a given trajectory for the SDC on the road segment based on the sequence of edges. The causing comprises causing, by the electronic device, operation of the SDC for travelling on the road segment during the second time interval in accordance with the given trajectory.

In a second broad aspect of the present technology, there is provided a method of operating a Self-Driving Car (SDC) on a road segment. The SDC travels on the road segment. The SDC is controlled by an electronic device. The method is executable by the electronic device. The method comprises executing, in real-time by the electronic device, a first processing pipeline. The executing the first processing pipeline comprises generating, by the electronic device, static attributes for a plurality of potential positions of the SDC on the road segment for a first time interval. A given static attribute is indicative of information about a static object on the road segment relative to a respective potential position. The executing the first processing pipeline comprises caching, by the electronic device in a cache memory, the static attributes in association with the respective ones of the plurality of potential positions. The method comprises executing, in real-time by the electronic device, a second processing pipeline in parallel with the first processing pipeline. The executing the second processing pipeline comprises generating, by the electronic device, a graph-structure for operating the SDC on the road segment during a second time interval. The graph-structure has nodes and edges. A given node is associated with a respective potential position of the SDC on the road segment. A given edge is representative of a transition of the SDC between potential positions of the respective pair of nodes and associated with a respective set of intermediate potential positions between the potential positions of the respective pair of nodes. The generating the graph-structure comprises generating, by the electronic device, dynamic attributes for a given edge of the graph-structure. A given dynamic attribute is indicative of information about a moving object on the road segment relative to a respective one of a respective set of intermediate potential positions. The generating the graph-structure comprises acquiring, by the electronic device from the cache memory, static attributes for the given edge of the graph-structure. The static attributes for the given edge includes static attributes cached in association with the respective set of intermediate potential positions. A length of the first time interval is pre-selected based on a length of the second time interval for reducing processing resources of the electronic device for executing the first processing pipeline.

In a third broad aspect of the present technology, there is provided an electronic device for operating a Self-Driving Car (SDC) on a road segment. The SDC travels on the road segment. The electronic device is configured to execute, in real-time, a first processing pipeline. To execute the first processing pipeline the electronic device is configured to generate static attributes for a plurality of potential positions of the SDC on the road segment. A given static attribute is indicative of information about a static object on the road segment relative to a respective potential position. To execute the first processing pipeline the electronic device is configured to cache, in a cache memory, the static attributes in association with the respective ones of the plurality of potential positions. The electronic device is configured to execute, in real-time, a second processing pipeline in parallel with the first processing pipeline. To execute the second processing pipeline the electronic device is configured to generate a graph-structure for operating the SDC on the road segment. The graph-structure has nodes and edges. A given node is associated with a respective potential position of the SDC on the road segment. A given edge is representative of a transition of the SDC between potential positions of the respective pair of nodes and associated with a respective set of intermediate potential positions between the potential positions of the respective pair of nodes. To generate the graph-structure the electronic device is configured to generate dynamic attributes for a given edge of the graph-structure. A given dynamic attribute is indicative of information about a moving object on the road segment relative to a respective one of a respective set of intermediate potential positions. To generate the graph-structure the electronic device is configured to acquire, from the cache memory, static attributes for the given edge of the graph-structure. The static attributes for the given edge includes the static attributes cached in association with the respective set of intermediate potential positions, such that the given edge in the graph-structure is associated with the static attributes generated by the first processing pipeline and with the dynamic attributes generated by the second processing pipeline.

In some embodiments of the electronic device, the graph-structure is a first graph-structure, and the electronic device configured to generate the first graph-structure is for operating the SDC on the road segment during a first time interval, and to execute the second processing pipeline comprises the electronic device configured to generate a second graph-structure for operating the SDC on the road segment during a second time interval. The second graph-structure has the given edge of the first graph-structure. To generate the second graph-structure comprises the electronic device configured to generate updated dynamic attributes for the given edge. A given updated dynamic attribute is indicative of updated information about the moving object on the road segment relative to the respective one of the respective set of intermediate potential positions. To generate the second graph-structure comprises the electronic device configured to acquire, from the cache memory, the static attributes for the given edge, such that the given edge in the second graph-structure is associated with the static attributes generated by the first processing pipeline and with the updated dynamic attributes generated by the second processing pipeline.

In some embodiments of the electronic device, to generate the static attributes for the plurality of potential positions of the SDC on the road segment is performed at a first moment in time, and to execute the first processing pipeline comprises the electronic device configured to generate updated static attributes for the plurality of potential positions at a second moment in time, the first moment in time and the second moment in time defining a third time interval. A length of the third time interval is pre-selected based on a length of at least one of the first time interval and the second time interval for reducing processing resources of the electronic device required for executing the first processing pipeline.

In some embodiments of the electronic device, to generate the static attributes for the plurality of potential positions comprises the electronic device configured to apply a prioritization logic for determining an order of potential positions for which the static attributes are to be generated in the first processing pipeline.

In some embodiments of the electronic device, the plurality of potential positions includes a pre-selected number of potential positions, and the electronic device triggers caching of the static attributes once the static attributes are generated for the pre-selected number of potential positions.

In some embodiments of the electronic device, the electronic device configured to generate the static attributes for the plurality of potential positions of the SDC on the road segment of the first processing pipeline asynchronously from the electronic device configured to generate the dynamic attributes for the given edge of the graph-structure of the second processing pipeline.

In some embodiments of the electronic device, the given dynamic attribute of the respective edge is one of: a distance between a given one of the respective set of intermediate potential positions and a position of an other moving vehicle on the road segment, a distance between the given one of the respective set of intermediate potential positions and a position of a moving pedestrian on the road segment, and a distance between the given one of the respective set of intermediate potential positions and a position of a moving cyclist on the road segment.

In some embodiments of the electronic device, the given static attribute of the respective edge is one of: a distance between a given one of the respective set of intermediate potential positions and a position of a road cone on the road segment, a distance between the given one of the respective set of intermediate potential positions and a position of a stop sign on the road segment, a distance between the given one of the respective set of intermediate potential positions and a position of a lane on the road segment, and a distance between a given one of the respective set of intermediate potential positions and a position of a lane center of the lane on the road segment.

In some embodiments of the electronic device, the electronic device is further configured to cause operation of the SDC on the road segment based on the graph-structure. To cause comprises the electronic device configured to determine a cost of the given edge in the graph-structure based on the respective static and dynamic attributes. To cause comprises the electronic device configured to determine a sequence of edges in the graph-structure representative of a potential path for the SDC on the road segment. The sequence of edges includes the given edge and is associated with an acceptable total cost of edges in the sequence. To cause comprises the electronic device configured to generate a given trajectory for the SDC on the road segment based on the sequence of edges. To cause comprises the electronic device configured to cause operation of the SDC for travelling on the road segment in accordance with the given trajectory.

In some embodiments of the electronic device, the electronic device is further configured to cause operation of the SDC on the road segment during the second time interval based on the second graph-structure. To cause comprises the electronic device configured to determine a cost of the given edge in the second graph-structure based on the respective static and updated dynamic attributes. To cause comprises the electronic device configured to determine a sequence of edges in the second graph-structure representative of a potential path for the SDC on the road segment. The sequence of edges includes the given edge and being associated with an acceptable total cost of edges in the sequence. To cause comprises the electronic device configured to generate a given trajectory for the SDC on the road segment based on the sequence of edges. To cause comprises the electronic device configured to cause operation of the SDC for travelling on the road segment during the second time interval in accordance with the given trajectory.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
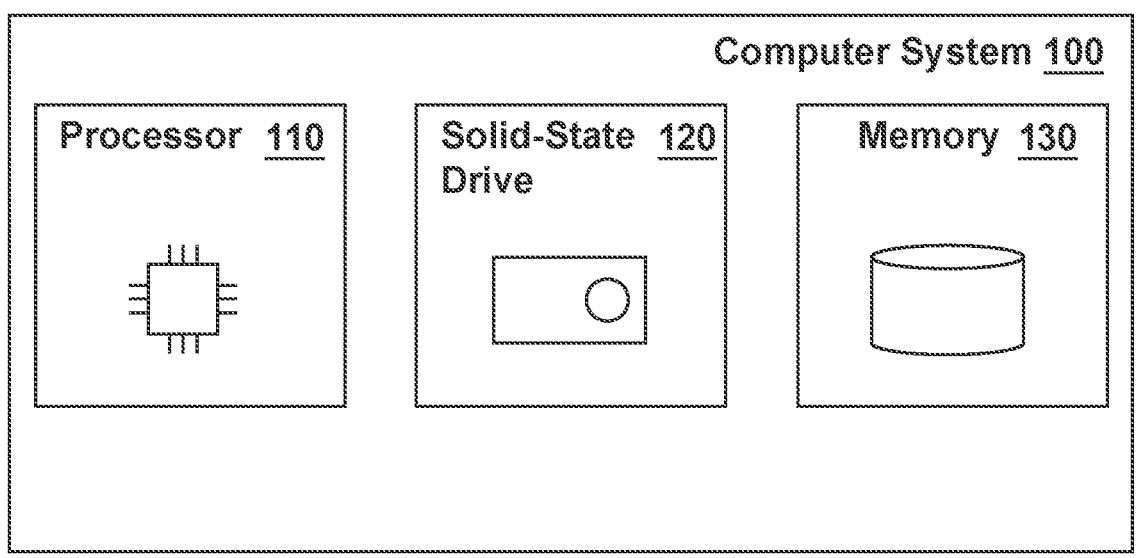
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
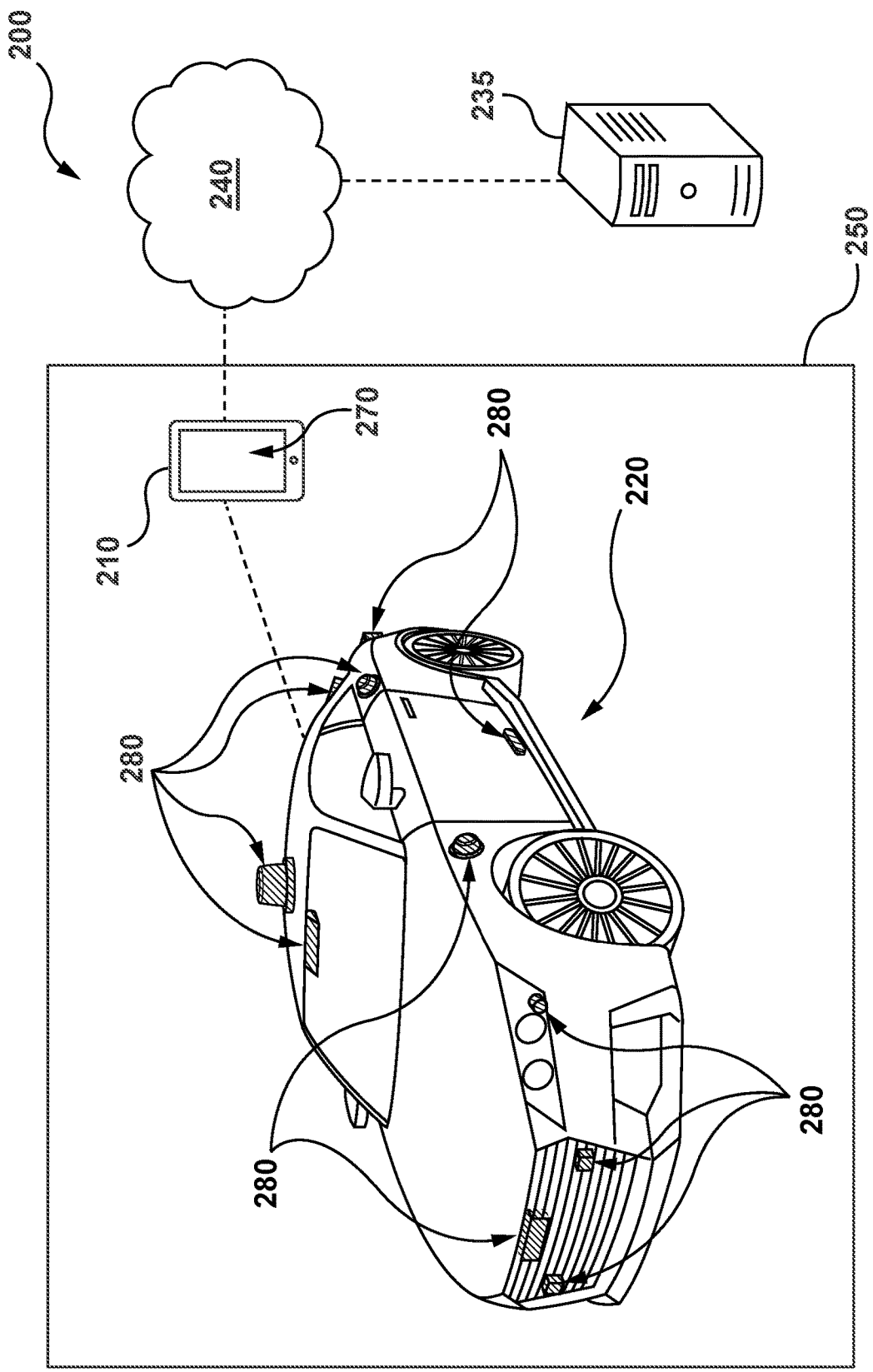
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle 220.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more Light Detection and Ranging (LIDAR) systems that are mounted to the vehicle 220 and communicatively coupled to the processor 110. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

In the context of the present technology, the electronic device 210 is configured to detect one or more objects in the surroundings 250 of the vehicle 220 based on data acquired from one or more camera systems and from one or more LIDAR systems. For example, the electronic device 210 configured to detect a given object in the surroundings 250 of the vehicle 220 may be configured to identify LIDAR data and camera data associated with the given object, generate an "embedding" representative of features associated with the given object, and detect the object by generating a bounding box for the object.

Figure 3:
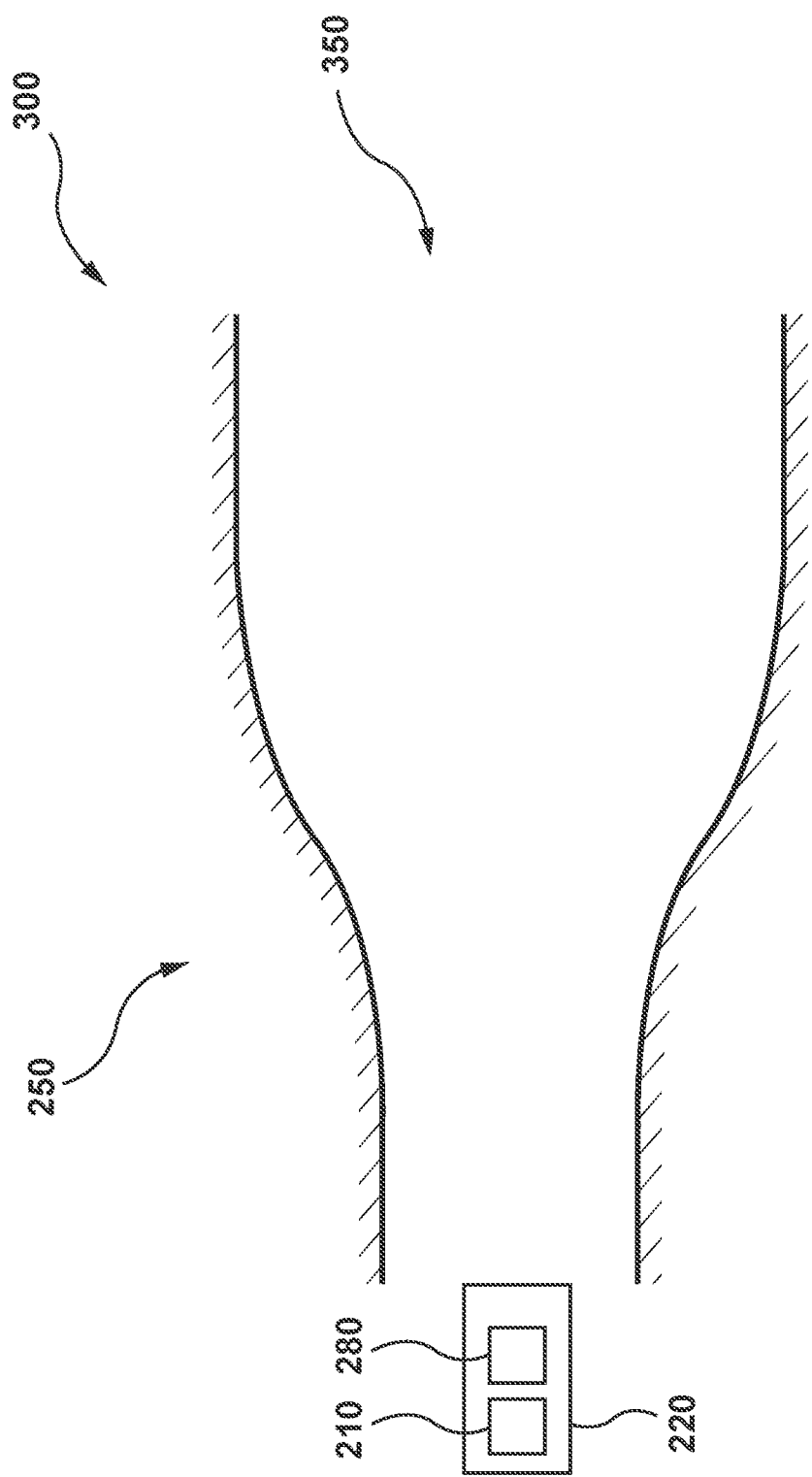
FIG. 3 depicts a representation of a vehicle travelling on a road segment in accordance with some embodiments of the present technology.

With reference to FIG. 3, there is an illustrative example 300 of the vehicle 220 in the surroundings 250. Let it be assumed that the vehicle 220 is travelling on a road segment 350. The electronic device 210 may receive from the sensor system 280 information about the surroundings 250 of the vehicle 220, and more particularly, about the road segment 350 and one or more "actors" (also sometimes referred to as "agents") on the road segment 350, such as neighboring objects in surroundings of the vehicle 220.

The electronic device 210 is configured to generate a "graph-structure" for operating the vehicle 220 on the road segment at a given moment in time. For instance, at a given moment in time, the electronic device 210 may be configured to generate a graph-structure having nodes and edges connecting respective pairs of nodes thereof. Nodes are representative of respective potential positions of the vehicle 220 on the road segment 350 and edges are representative of transitions between respective pairs of potential positions. In this instance, the electronic device 210 may determine a given sequence of edges in such a graph-structure which (i) is associated with an acceptable total cost of edges in the sequence, and (ii) is representative of a potential path that the SDC should follow on the road segment 350. It should be noted that the electronic device 210 may make use of this information for generating trajectory data for the vehicle 220 to actually follow that path on the road segment 350.

Figure 4:
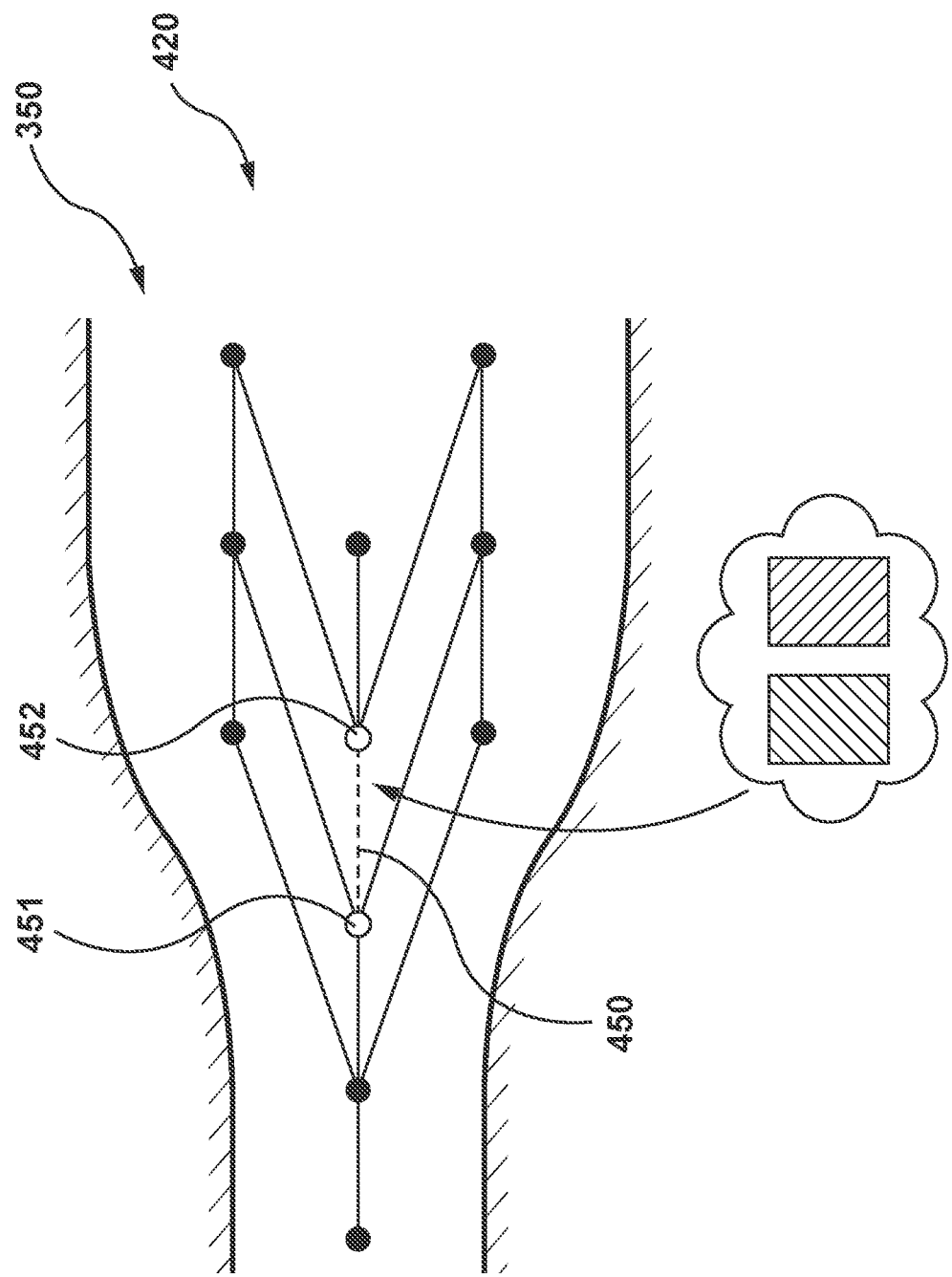
FIG. 4 depicts a representation of a first graph-structure generated by an electronic device of FIG. 2 for the road segment in accordance with some embodiments of the present technology.

To better illustrate this, reference will now be made to FIG. 4 depicting a non-limiting example of a graph-structure 420 that the electronic device 210 may be configured to generate for the road segment 350 at a given moment in time. The graph-structure 420 has a plurality of nodes (not numbered) and a plurality of edges (not numbered) connecting respective nodes of the plurality of nodes. For example, an edge 450 of the graph-structure 420 connects a first node 451 and a second node 452. A given node is associated with a respective potential position of the vehicle 220 on the road segment 350. A given edge is representative of a transition of the vehicle 220 between potential positions of the respective pair of nodes. For example, the edge 450 is representative of the transition of the vehicle 220 between its potential positions of the first node 451 and the second node 452.

It should be noted that the electronic device 210 may be configured to store information in association with a respective node and a respective edge of the graph-structure 420. For example, the electronic device 210 may be configured to store positional data in association with a given node. In another example, the electronic device 210 may be configured to store, in association with a given edge, the positional data of a respective pair of nodes.

Furthermore, it is contemplated that additional data may be stored in association with a respective node of the graph-structure 420. It can be said that additional data may be stored in association with a respective node of the graph-structure 420 and which is indicative of at least some information about a potential state of the vehicle 220 on the road segment 350.

In the context of the present technology, when generating the graph-structure 420, the electronic device 210 is configured to generate attributes for respective edges of the graph-structure 420 and store these attributes in association with the respective edges in cache memory. In at least some embodiments of the present technology, the electronic device 210 may be configured to assign a unique identifier (UID) to a respective node of the graph-structure 420. As such, the electronic device 210 may be configured to store information about a given edge (including its attributes) in association with a respective pair of UIDs in the cache memory. Therefore, when information about a given edge is to be retrieved for further processing, the electronic device 210 may use a pair of UIDs of a respective pair of nodes as a "key" for accessing the information about the given edge in the cache memory. It can be said that the electronic device 210 may be configured to store an "entry" for a given edge with a respective pair of UIDs as a key for that entry in the cache memory.

The electronic device 210 may make use of the graph-structure 420 for operating the vehicle 220 on the road segment 350. To that end, the electronic device 210 may generate a "path" for the vehicle 220 on the road segment and which is representative of a respective sequence of edges in the graph-structure 420. Broadly speaking, the electronic device 210 may be configured to generate one or more potential paths that the vehicle 220 may follow on the road segment 350. These paths may also be ranked amongst each other based on a total cost associated with a respective sequence of edges.

For example, edge cost criteria may be applied onto attributes of the respective edges in a given sequence for determining a "total cost" for the sequence of edges. The electronic device 210 may rank the paths based on how costly a respective sequence of edges is. The electronic device 210 may also use the attributes of the respective sequence of edges for generating a trajectory for the vehicle 220 for following a given path. This means that the electronic device 210 may be configured to generate trajectory data for operating the vehicle 220 on the road segment 350 based on the edge data associated with the sequence of the edges. The electronic device 210 may also cause operation of the vehicle 220 in accordance with the so-determined trajectory on the road segment 350. It should be noted that the electronic device 210 may be configured to periodically generate graph-structures at respective moments in time during operation of the vehicle 220 similarly to how the electronic device 210 generate the graph-structure 420.

It should be noted that generation of the graph-structure 420 is a computationally expensive operation, which can take a considerable amount of time. This is due to the fact that the electronic device 210 needs to compute a plurality of attributes for respective edges of the graph-structure 420. In at least some embodiments of the present technology, developers of the present technology have devised methods and electronic devices for increasing the efficiency of the graph-structure generation process.

It should be noted that a given edge may be associated with at least two types of attributes, namely "static attributes" and "dynamic attributes". How static attributes and dynamic attributes are generated will be discussed in greater details herein further below. However, it should be noted that developers of the present technology have realized that the electronic device 210 may be configured to parallelize the generation processes of static and dynamic attributes. In other words, it is contemplated that the electronic device 210 may be configured to execute a first processing pipeline for generating dynamic attributes for edges of the graph-structure 420, and a second (parallel) processing pipeline for generating static attributes for edges of the graph-structure 420.

In the context of the present technology, a first given processing pipeline may be referred to as a "main processing pipeline" or a "dynamic processing pipeline" that is used by the electronic device 210 for (i) generating dynamic attributes for respective edges of a given graph-structure, and (ii) retrieving from cache memory static attributes for respective edges of the given graph-structure. A second given processing pipeline may be referred to as a "support processing pipeline" or a "static processing pipeline" that is used by the electronic device for (i) generating static attributes for potential positions on the road segment 350, and (ii) caching the static attributes of respective potential positions on the road segment 350 in the cache memory.

Developers of the present technology have realized that executing the two processing pipelines in parallel (e.g., computing dynamic attributes and static attributes in a parallel manner) may reduce the amount of time necessary for generating a graph-structure and, in turn, may reduce the total amount of time necessary for generating trajectory data for operating the vehicle 220 on the road segment 350. Increasing computational speed of the graph-structure generation process during operation of the vehicle 220 is beneficial for the operation of the vehicle 220.

Figure 5:
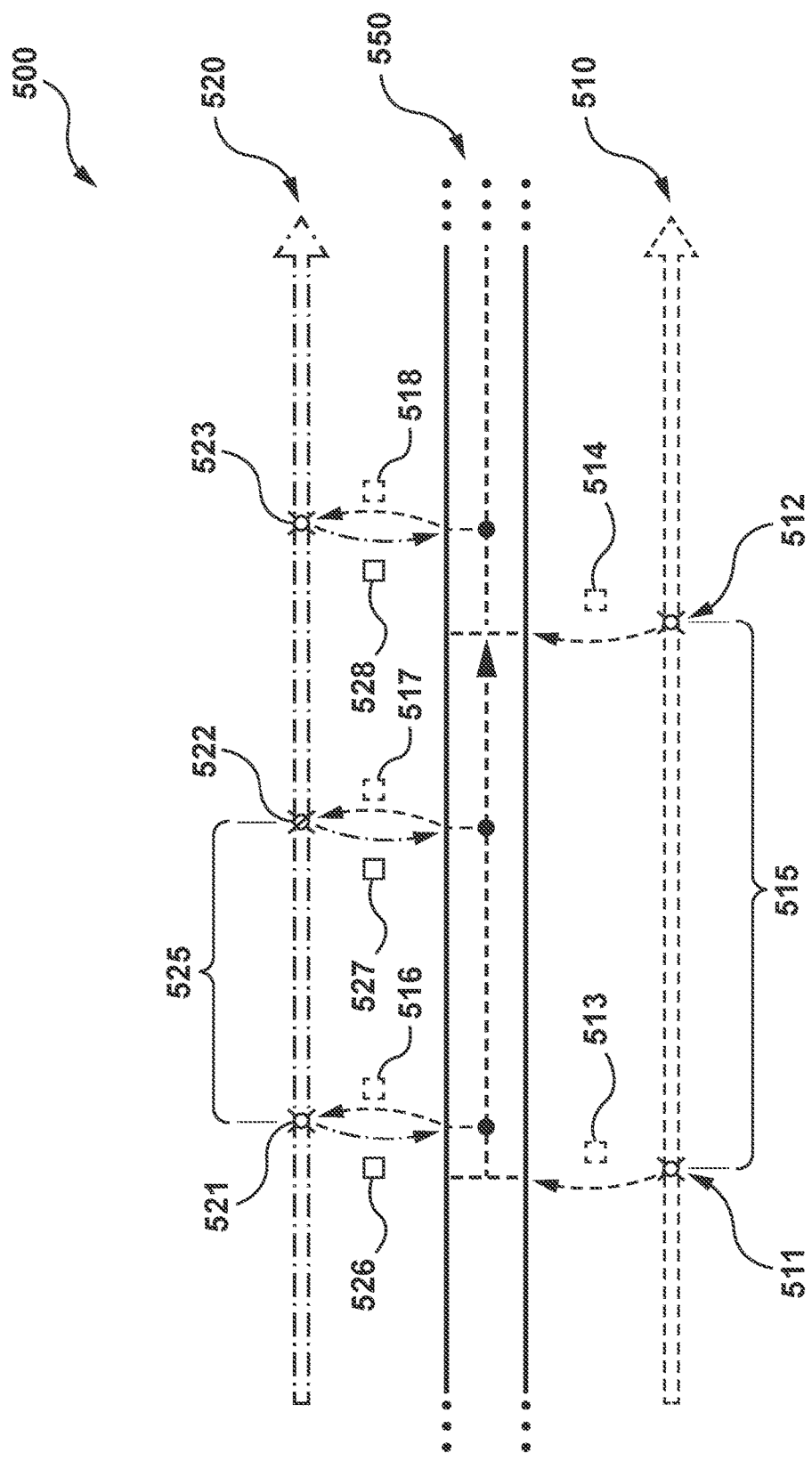
FIG. 5 depicts a representation of how data is generated in a parallel support processing pipeline of the electronic device, stored in a cache memory of the electronic device, and retrieved therefrom for a main processing pipeline of the electronic device in accordance with some embodiments of the present technology.

How the electronic device 210 is configured to implement the support processing pipeline and the main processing pipeline in at least some embodiments of the present technology will be discussed in turn with reference to FIG. 5.
Static Pipeline There is depicted in FIG. 5 a representation of a support processing pipeline 510 executed by the electronic device 210 in real-time during operation of the vehicle 220. As part of the support processing pipeline 510, the electronic device 210 is configured to perform a first static attribute caching (SAC) operation 511 at a first moment in time (not numbered) and a second SAC operation 512 at a second moment in time (not numbered). During the first SAC operation 511, the electronic device 210 is configured to cache first static data 513 in a cache 550. During the second SAC operation 512, the electronic device 210 is configured to cache second static data 514 in the cache 550.

It should be noted that the electronic device 210 may generate the first static data 513 by computing static attributes for a plurality of potential positions of the vehicle 220 on the road segment 350. Broadly speaking, a given static attribute is indicative of information about a static object on the road segment 350 relative to a respective potential position. For example, a given static attribute may be, but is not limited to:
  a distance between the respective potential position and a position of a road cone on the road segment 350;
  a distance between the respective potential position and a position of a stop sign on the road segment 350;
  a distance between the respective potential position and a position of a lane on the road segment 350; and
  a distance between the respective potential position and a position of a lane center of a lane on the road segment 350.

It is contemplated that the electronic device 210 may be configured to compute static attributes for a large number of potential positions on the road segment 350. For example, the electronic device 210 may be configured to generate static attributes for potential positions of respective nodes of a given graph-structure and for other potential positions that are intermediate to the respective potential positions of nodes of the given graph-structure.

In at least some embodiments of the present technology, due to the fact that the electronic device 210 may identify a large number of potential positions on the road segment 350, the electronic device 210 may be configured to apply a "priority" logic for determining an order of potential positions for which the static attributes are to be generated. For example, the electronic device 210 may be configured to prioritize generation of static attributes for potential positions that are located closest to lane centers of lanes. In one embodiment, the electronic device 210 may be configured to generate static attributes for a pre-selected number of top priority potential positions. In an other embodiment, the electronic device 210 may be configured to generate static attributes for potential positions having been ordered based on their priority and until a pre-selected time limit is reached.

Once the electronic device 210 generates static attributes for a plurality of potential positions on the road segment 350, the electronic device 210 may store the first static data 513 in the cache 550 in association with the respective potential positions.

The electronic device 210 may also be configured to perform generation of static attributes for respective potential positions in a periodical manner. For example, once the electronic device 210 performs the first SAC operation 511, the electronic device 210 may begin a new cycle of static attributes generation. In some embodiments, it can be said that the electronic device 210 may be configured to re-compute and/or update static attributes for at least some potential positions and/or compute static attributes for other potential positions. This generation process occurs during a time interval 515 and ends with the second SAC operation 512 during which the second static data 514 is stored in the cache 550.

It can be said that the electronic device 210 may be configured to store static data in the cache 550 in "batches"—that is, during a respective static generation cycle, the electronic device 210 may be configured to generate respective static data and store (and/or update) the static data in the cache 550. The size of a given batch, such as the size of the second static data 514, for example, may depend on a length of the time interval 515. How the length of the time interval 515 is determined will be discussed in greater details herein further below.
Dynamic Pipeline Also depicted in FIG. 4, is a representation of a main processing pipeline 520 executed by the electronic device 210 in real-time during operation of the vehicle 220. As part of the main processing pipeline 520, the electronic device 210 is configured to perform a first graph-structure generation (GSG) operation 521 at a first moment in time (not numbered), a second GSG operation 522 at a second moment in time (not numbered), and a third GSG operation 523 at a third moment in time (not numbered).

During the first GSG operation 521, the electronic device 210 is configured to generate dynamic attributes for respective edges of a first graph-structure and retrieve static attributes for respective edges of the first graph-structure. The electronic device 210 may be configured to use the so-generated first graph-structure for operating the vehicle 220 during a time interval 525, and/or until the second GSG operation 522 at the second moment in time. During the second GSG operation 522, the electronic device 210 is configured to generate dynamic attributes for respective edges of a second graph-structure and retrieve static attributes for respective edges of the second graph-structure. It is contemplated that the first graph-structure and the second graph-structure may share at least some edges, or in other words, at least some edges of the second graph-structure may correspond to edges of the first graph-structure, without departing from the scope of the present technology. The electronic device 210 may be configured to use the so-generated second graph-structure for operating the vehicle 220 until the third GSG operation 523 at the third moment in time. During the third GSG operation 523, the electronic device 210 is configured to generate dynamic attributes for respective edges of a third graph-structure and retrieve (latest/updated) static attributes for respective edges of the third graph-structure. It is contemplated that the second graph-structure and the third graph-structure may share at least some edges, or in other words, at least some edges of the third graph-structure may correspond to edges of the second graph-structure, without departing from the scope of the present technology. The electronic device 210 may be configured to use the so-generated third graph-structure for operating the vehicle 220 until a next GSG operation.

Returning to the description of the first GSG operation 521, the electronic device 210 may generate dynamic attributes for respective edges of the first graph-structure. Broadly speaking, a given dynamic attribute is indicative of information about a moving object on the road segment 350 relative to a respective one of a respective set of intermediate potential positions associated with a given edge. As mentioned above, a given edge connects a pair of respective nodes associated with a respective pair of potential positions of the vehicle 220 on the road segment 350. However, it can also be said that a given edge is also associated with a set of intermediate potential positions on the road segment 350 between the respective pair of potential positions, and in which intermediate potential positions the vehicle 220 will be located if the vehicle 220 attempts a transition between the respective pair of potential positions (associated with the respective pair of nodes).

For example, a given dynamic attribute may be, but is not limited to:
 a distance between a respective intermediate potential position and a position of an other moving vehicle on the road segment 350;
 a distance between a respective intermediate potential position and a position of a moving pedestrian on the road segment 350; and
 a distance between a respective intermediate potential position and a position of a moving cyclist on the road segment 350.

In addition to generating dynamic attributes for respective edges of the first graph-structure, the electronic device 210 is further configured during the first GSG operation 521 to retrieve static attributes for respective edges of the first graph-structure from the cache 550. To that end, the electronic device 210 may be configured to send a request 526 to the cache 550 for retrieving relevant static data.

The request 526 may take many forms. In one embodiment, the request 526 may be indicative of information regarding pairs of respective UIDs associated with respective edges from the first graph-structure. In an other embodiment, the request 526 may also be indicative of information regarding respective sets of intermediate potential positions associated with respective edges from the graph-structure. Irrespective of specific information included in the request 526, the request 526 comprises information that allows identifying and retrieving static attributes stored in the cache 550 and which are associated with sets of intermediate potential positions of respective edges of the first graph-structure. As such, the electronic device 210 may acquire third static data 516 comprising static attributes associated with sets of potential positions of respective edges of the first graph-structure.

It can be said that the third static data 516 is a subset of the first static data 513 stored by the electronic device 210 during execution of the support processing pipeline 510.

By the same token, during the second GSG operation 522, the electronic device 210 may generate dynamic attributes for respective edges of the second graph-structure, and retrieve static attributes for respective edges of the second graph-structure from the cache 550. To that end, the electronic device 210 may be configured to send a request 527 to the cache 550 for retrieving relevant static data. The request 527 comprises information that allows identifying and retrieving static attributes stored in the cache 550 and which are associated with potential positions of respective edges of the second graph-structure. As such, the electronic device 210 may acquire fourth static data 517 comprising static attributes associated with sets of potential positions of respective edges of the second graph-structure.

It can be said that the fourth static data 517 is a subset of the first static data 513 stored by the electronic device 210 during execution of the support processing pipeline 510. In some embodiments of the present technology, if the first graph-structure and the second graph-structure share at least one edge, it is contemplated that the third static data 516 and the fourth static data 517 may both include static attributes for the at least one shared edge.

It should be noted that static attributes of a given edge are a less likely to change in time if compared to dynamic attributes of the given edge. For example, a distance between a potential position on the road segment 350 and a static object is likely to stay the same, whereas a distance between that potential position and a moving object is likely to change. For that reason, it is beneficial to perform GSG operations more frequently than the SAC operations in order to have accurate attributes associated with edges of graph-structures.

Similarly to what has been described above for the first and second GSG operations 521 and 522, during the third GSG operation 523, the electronic device 210 may generate dynamic attributes for respective edges of the third graph-structure, and retrieve static attributes for respective edges of the third graph-structure from the cache 550. To that end, the electronic device 210 may be configured to send a request 528 to the cache 550 for retrieving relevant static data. The request 528 comprises information that allows identifying and retrieving static attributes stored in the cache 550 and which are associated with potential positions of respective edges of the third graph-structure. As such, the electronic device 210 may acquire fifth static data 518 comprising static attributes associated with sets of potential positions of respective edges of the third graph-structure.

It can be said that the fifth static data 518 is a subset of the second static data 514 stored by the electronic device 210 during execution of the support processing pipeline 510, since the second SAC operation 512 has occurred prior to the third GSG operation 523.

Developers of the present technology have realized that so-excluding computation of static attributes from the main processing pipeline 520, and in a sense "offloading" this computation to the parallel support processing pipeline 510, allows reducing the amount of time required by the electronic device 210 for performing the GSG operations 521, 522, and 523 if compared to a given GSG operation during which both dynamic and static attributes have to be computed in a same processing pipeline. Indeed, as opposed to a GSG operation during which both dynamic and static attributes are computed in a same processing pipeline, some embodiments of the present technology allow parallel computation and caching of the static attributes so that they can be retrieved from the cache during the GSG operations 521, 522, and 523, leaving computation of only dynamic attributes in the main processing pipeline 520.

It should also be noted that in the non-limiting example illustrated on FIG. 5, GSG operations and SAC operations do not occur at the same moments in time. Thus, it can be said that in some embodiments of the present technology, generation of static attributes for the plurality of potential positions (SAC operations) by the electronic device 210 can be executed asynchronously from generation of dynamic attributes (GSG operations) by the electronic device 210. In fact, as previously alluded, the periodicity of GSG operations may be different from the periodicity of the SAC operations, meaning that GSG operations can occur at a different frequency than the SAC operations.

In at least some embodiments of the present technology, it is contemplated that the frequency of SAC operations may be pre-selected by an operator of the electronic device 210 based on a frequency of GSG operations.

In a first example, let it be assumed that the time interval 515 is selected to be considerably shorter to the time interval 525, meaning that the SAC operations will be performed at a considerably higher frequency than GSG operations. Such selection of the time interval 515 based on the time interval 525 may be undesirable as a large number of batches will need to be cached. It should be noted that performing writing calls on the cache requires considerable resources, and therefore, having a large number of batches increases that amount of resources necessary for their caching.

In a second example, let it be assumed that the time interval 515 is selected to be considerably longer than the time interval 525, meaning that SAC operations will be performed at a considerably lesser frequency than GSG operations. Such selection of the time interval 515 based on the time interval 525 may be undesirable as very large batches will need to be cached at each SAC operation. It should be noted that the longer the time interval 525, the more time the electronic device 210 has for generating static data, and the more static data will need to be cached at the second SAC operation 512. However, the larger the batch, the more time is required for its caching in the cache 550, and so there is a risk that static data contained therein may already be outdated by the time the caching of a large batch is completed.

Therefore, developers of the present technology have realized that the operator of the electronic device 210 may select a length of the time interval 515 based on the length of the time interval 525 for mitigating a trade-off caused by the size of batches generated by the support processing pipeline 510. In at least some embodiments of the present technology, the operator of the electronic device 210 may pre-select the length of the time interval 515 based on the length of the time interval 525 such that the time interval 515 is not shorter than the time interval 525, and such that the resulting batches generated by the support processing pipeline 510 are not too large, nor too numerous.

In one example, the time interval 515 associated with the SAC operations may be 400 milliseconds. In an other example, the time interval 515 associated with the SAC operations may be 450 milliseconds. In further examples, the time interval 515 may be between 400 and 450 milliseconds. In yet other examples, the time interval 515 may be about 420 milliseconds.

In one example, the time interval 525 associated with the GSG operations may be 300 milliseconds. In an other example, the time interval 525 associated with the GSG operations may be 350 milliseconds. In further examples, the time interval 525 may be between 300 and 350 milliseconds. In yet other examples, the time interval 525 may be about 320 milliseconds.

In further embodiments of the present technology, it is contemplated that the electronic device 210 may be configured to further cache dynamic attributes generated during a given GSG operation and then retrieve at least some of them during a subsequent GSG operation for reducing the amount of time required for generating a respective graph-structure.

Figure 6:
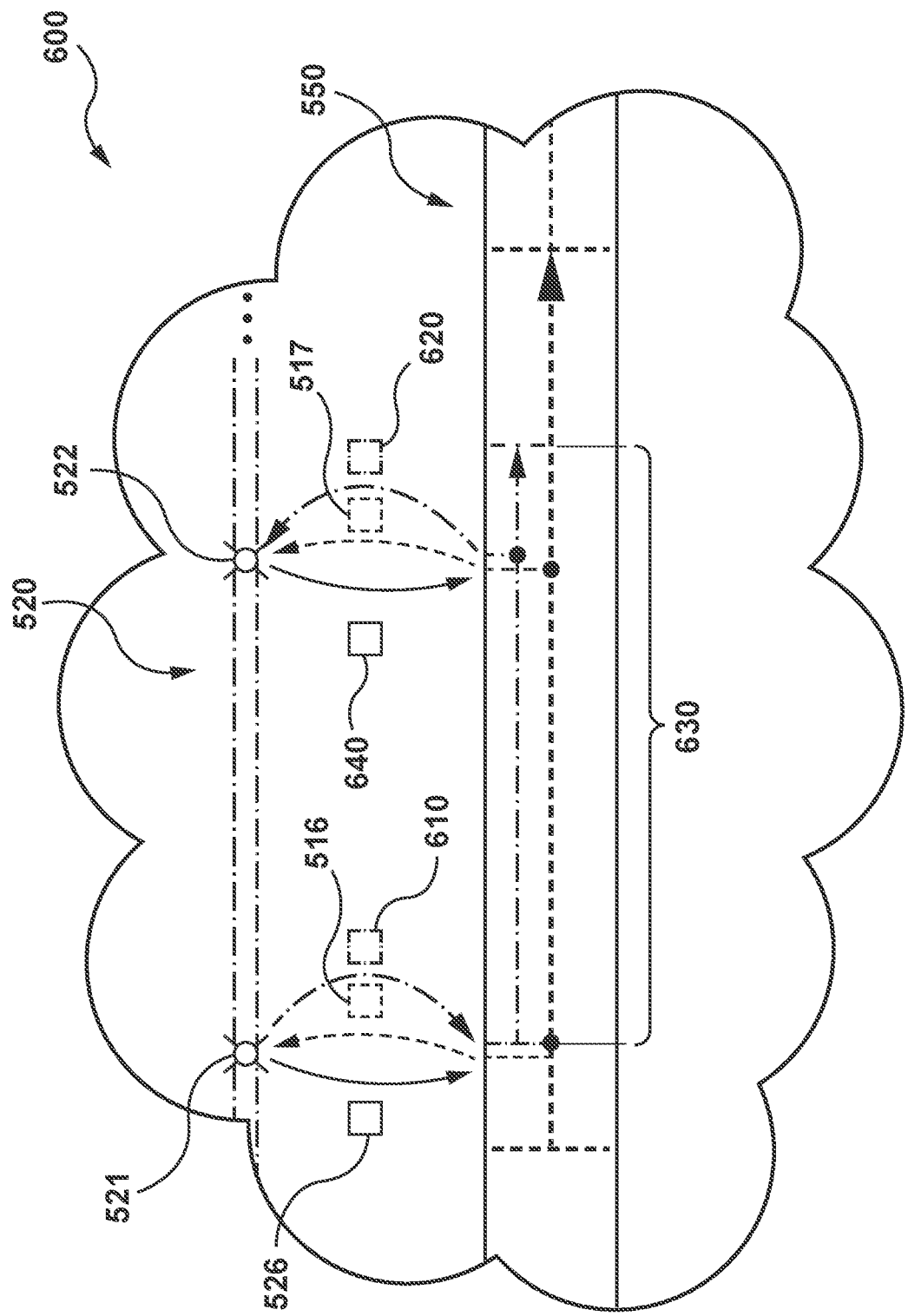
FIG. 6 depicts a representation of how data is generated in the main processing pipeline, stored in a cache memory of the electronic device, and retrieved therefrom for the main processing pipeline in accordance with some embodiments of the present technology.

To better illustrate this, reference will now be made to FIG. 6 depicting a representation 600 of how some dynamic attributes may be cached in the cache 550, in addition to static attributes. In addition to what has been described with reference to FIG. 5 above, in the embodiment illustrated in FIG. 6, the electronic device 210 may be configured to further store first dynamic data 610 generated during the first GSG operation 521 in the cache 550. For example, the first dynamic data 610 may include dynamic attributes generated for respective edges of the first graph-structure that is generated during the first GSG operation 521. During the second GSG operation 522, the electronic device 210 is configured to generate the second graph-structure. In this embodiment, if the second graph-structure shares at least one edge with the first graph-structure generated during the first GSG operation 521, the electronic device 210 may be configured to send a request 640 to the cache 550 for retrieving the relevant static attributes (similarly to what has been described above), and also the dynamic attributes associated with the at least one edge that is shared by the first and the second graph-structures. As such, the electronic device 210 may acquire fourth static data 517 comprising static attributes associated with sets of potential positions of respective edges of the second graph-structure (similarly to what has been described above), and also second dynamic data 620 comprising dynamic attributes associated with the shared edges between the first and the second graph-structure.

Developers of the present technology have realized that caching dynamic attributes generated during a current GSG operation, in addition to static attributes, may further reduce the amount of time required for performing a subsequent GSG operation if a subsequent graph-structure is sharing edges with a current graph-structure.

For example, if a value of a dynamic attribute has been computed during the first GSG operation 521 for an edge that is relatively far from a current position of the vehicle 220 on the road segment 350, the accuracy of the value may be less important for the immediate operation of the vehicle 220. Hence, instead of re-computing the value of this dynamic attribute of a far edge during the second GSG operation 522, the electronic device 210 may re-use the value of the dynamic attribute computed during the first GSG operation 521.

In this embodiment illustrated in FIG. 6, the electronic device 210 may be configured to cache the first dynamic data 610 for a pre-determined time limit corresponding to a time interval 630. Temporarily caching dynamic attributes for edges may reduce the risk of using values of dynamic attributes that could no longer be accurate enough. Indeed, as dynamic attributes tend to change in time, values of dynamic attributes may no longer be eligible for re-use after the pre-determined time limit has passed.

Figure 7:
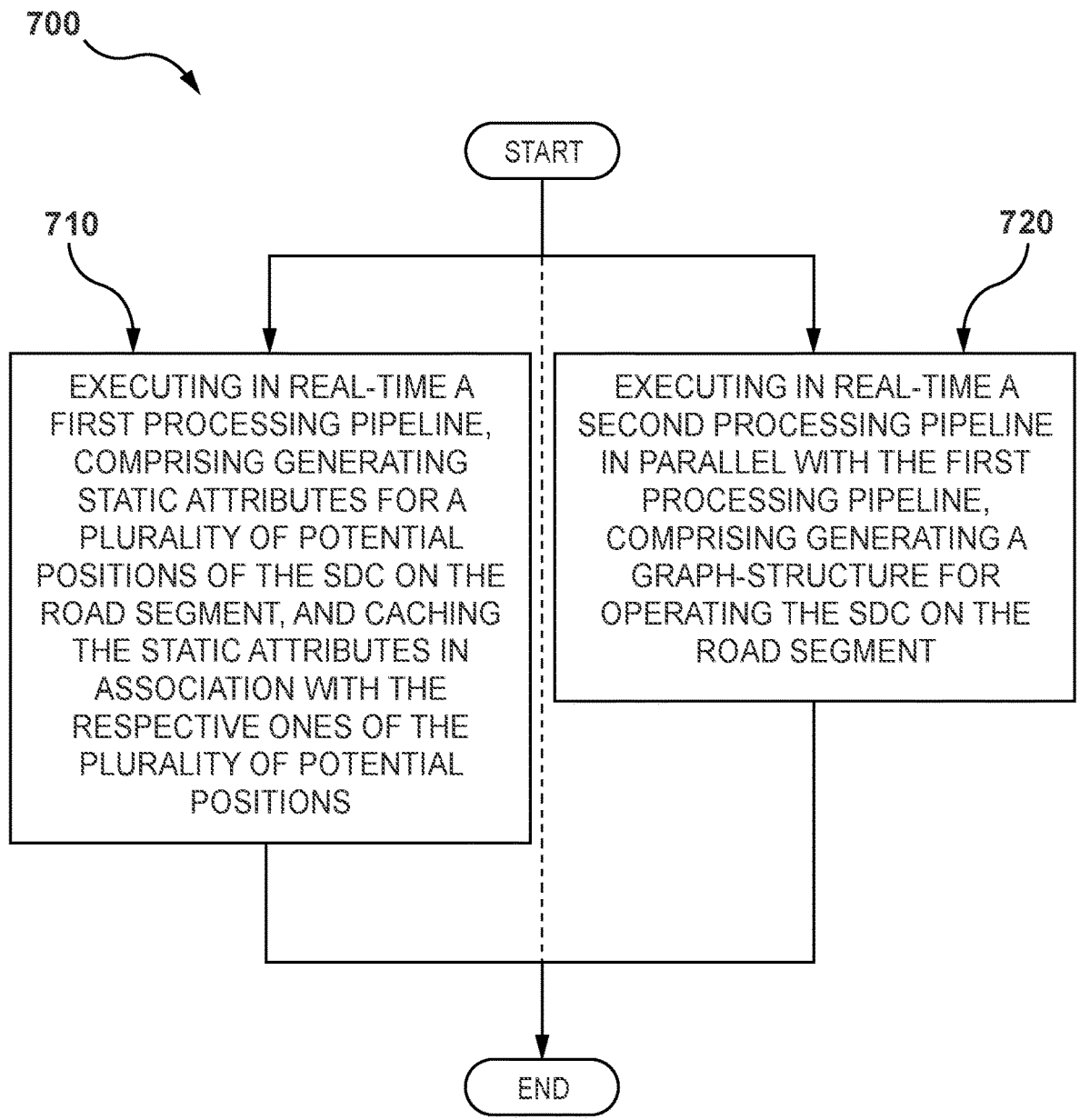
FIG. 7 is a schematic representation of a method performed by the electronic device in accordance with at least some non-limiting embodiments of the present technology.

With reference to FIG. 7, there is depicted a method 700 that is performed by the electronic device 210 in at least some embodiments of the present technology. It is contemplated that the method 700 may be performed by the electronic device 210 in real-time during operation of the vehicle 220. It is also contemplated that steps of the method 700 may be performed in parallel as will now be discussed in greater details.

STEP 710: Executing in Real-Time a First Processing Pipeline, Comprising Generating Static Attributes for a Plurality of Potential Positions of the SDC on the Road Segment, and Caching the Static Attributes in Association with the Respective Ones of the Plurality of Potential Positions The method 700 has a step 710 during which the electronic device 210 executes, in real-time, a first processing pipeline. In at least some embodiments, it can be said that the first processing pipeline is the support/static processing pipeline described above.

As part of the first processing pipeline, the electronic device 210 is configured to generate static attributes for a plurality of potential positions of the vehicle 220 on the road segment 350. Broadly speaking, a given static attribute is indicative of information about a static object on the road segment 350 relative to a respective potential position associated with a given edge. As part of the first processing pipeline, the electronic device 210 is configured to cache, in a cache memory (the cache 550), the static attributes in association with the respective ones of the plurality of potential positions. The cache 550 may be implanted as hardware component, a software component, and/or a combination of both for storing data so that future requests for that data can be serviced faster. For example, data stored in the cache 550 might be the result of an earlier computation or a copy of data stored elsewhere.

In some embodiments of the present technology, it is contemplated that the electronic device 210 may be configured to apply a prioritization logic for determining an order of potential positions for which the static attributes are to be generated in the first processing pipeline. For example, the plurality of potential positions for which static attributes are generated may include a pre-selected number of potential positions (top ranked based on the prioritization logic). The caching the static attributes may be triggered once the static attributes are generated for the pre-selected number of potential positions. In another example, the plurality of potential positions for which static attributes are generated may include top ranked potential positions from an order list of potential positions for which the electronic device 210 has enough time to generate static attributes before a pre-determined time limit expires.

In some embodiments, a given static attribute of a respective edge may be one of: a distance between a given one of respective set of intermediate potential positions and a position of a road cone on the road segment, a distance between the given one of the respective set of intermediate potential positions and a position of a stop sign on the road segment, a distance between the given one of the respective set of intermediate potential positions and a position of a lane on the road segment, and a distance between a given one of the respective set of intermediate potential positions and a position of a lane center of the lane on the road segment.

STEP 720: Executing in Real-Time a Second Processing Pipeline in Parallel with the First Processing Pipeline, Comprising Generating a Graph-Structure for Operating the SDC on the Road Segment The method has a step 720 during which the electronic device 210 is configured to execute, in real-time, a second processing pipeline in parallel with the first processing pipeline of the step 710. In at least some embodiments, it can be said that the second processing pipeline is a main/dynamic processing pipeline described above.

It can also be said that steps 710 and 720 of the method 700 can be executed by the electronic device 210 in parallel. In at least some embodiments, the electronic device 210 may be configured to dedicate first processing resources for executing the step 710 and second processing resources for executing the step 720. It is contemplated that the first processing resources may be distinct from the second processing resources.

As part of the second processing pipeline, the electronic device is configured to generate graph-structure for operating the vehicle 220 on the road segment 350. The graph-structure has nodes and edges, and where a given node is associated with a respective potential position of the vehicle 220 on the road segment 350, and where a given edge is representative of a transition of the vehicle 220 between potential positions of the respective pair of nodes. The given edge is associated with a respective set of intermediate potential positions between the potential positions of the respective pair of nodes.

As part of the second processing pipeline, during the generation of the graph-structure, the electronic device 210 is configured to generate dynamic attributes for a given edge of the graph-structure. Broadly speaking, a given dynamic attribute is indicative of information about a moving object on the road segment 350 relative to a respective one of a respective set of intermediate potential positions (and/or potential positions of respective pair of nodes).

In some embodiments, the given dynamic attribute of a respective edge may be one of: a distance between a given one of a respective set of intermediate potential positions and a position of an other vehicle on the road segment, a distance between the given one of the respective set of intermediate potential positions and a position of a pedestrian on the road segment, and a distance between the given one of the respective set of intermediate potential positions and a position of a cyclist on the road segment. It is contemplated that generation of static attributes may be performed by the electronic device 210 asynchronously from the generation of dynamic attributes.

As part of the second processing pipeline, during the generation of the graph-structure, the electronic device 210 is configured to acquire from the cache memory static attributes for the given edge of the graph-structure. The static attributes for the given edge include the static attributes cached in association with the respective set of intermediate potential positions and/or potential positions of a respective pair of nodes. The given edge in the graph-structure is thus associated with the static attributes generated by the first processing pipeline and with the dynamic attributes generated by the second processing pipeline.

In further embodiments of the present technology, the graph-structure may be a first graph-structure amongst a plurality of graph-structures to be generated in a periodical manner during operation of the vehicle 220. The electronic device 210 may be configured to use the first graph-structure for operation the vehicle 220 during a first time interval on the road segment 350. In these embodiments, as part of the second processing pipeline, the electronic device 210 may be configured to generate a second graph-structure for operating the vehicle 220 on the road segment 350 during a second time interval. The second graph-structure may share the given edge with the first graph-structure. The generation of the second graph-structure comprises the electronic device 210 configured to generate updated dynamic attributes for the given edge. A given updated dynamic attribute may be indicative of updated information about the moving object on the road segment relative to the respective one of the respective set of intermediate potential positions (and/or potential positions of the respective pair of nodes). The generation of the second graph-structure comprises the electronic device 210 configured to acquiring from the cache memory the static attributes for the given edge, such that the given edge in the second graph-structure is associated with the static attributes generated by the first processing pipeline and with the updated dynamic attributes generated by the second processing pipeline.

In some embodiments, generation of the static attributes for the plurality of potential positions of the vehicle 220 on the road segment 350 may be performed at a first moment in time. In these embodiments, execution of the first processing pipeline may further comprise the electronic device 210 configured to generate updated static attributes for the plurality of potential positions at a second moment in time, and where the first moment in time and the second moment in time defining a third time interval. It should be noted that a length of the third time interval may be pre-selected based on a length of at least one of the first time interval and the second time interval for reducing processing resources of the electronic device required for executing the first processing pipeline, as explained above.

In other embodiments, the method 700 may further comprise the electronic device 210 causing operation of the vehicle 220 on the road segment 350 based on the graph-structure. For example, the electronic device 210 may be configured to determine a cost of the given edge in the graph-structure based on the respective static and dynamic attributes. One or more cost criteria as known in the art may be used by the electronic device 210 for determining the cost. The electronic device 210 is also configured to determine a sequence of edges in the graph-structure representative of a potential path for the vehicle 220 on the road segment 350. The sequence of edges includes the given edge and is associated with an acceptable total cost of edges in the sequence. The electronic device 210 is also configured to generate a given trajectory for the vehicle 220 on the road segment 350 based on the sequence of edges. For example, the electronic device 210 may be configured to generate inter alia a speed profile for the vehicle 220 for following the sequence of edges on the road segment 350. The electronic device 210 is also configured to cause operation of the vehicle 220 for travelling on the road segment in accordance with the given trajectory.

Figure 8:
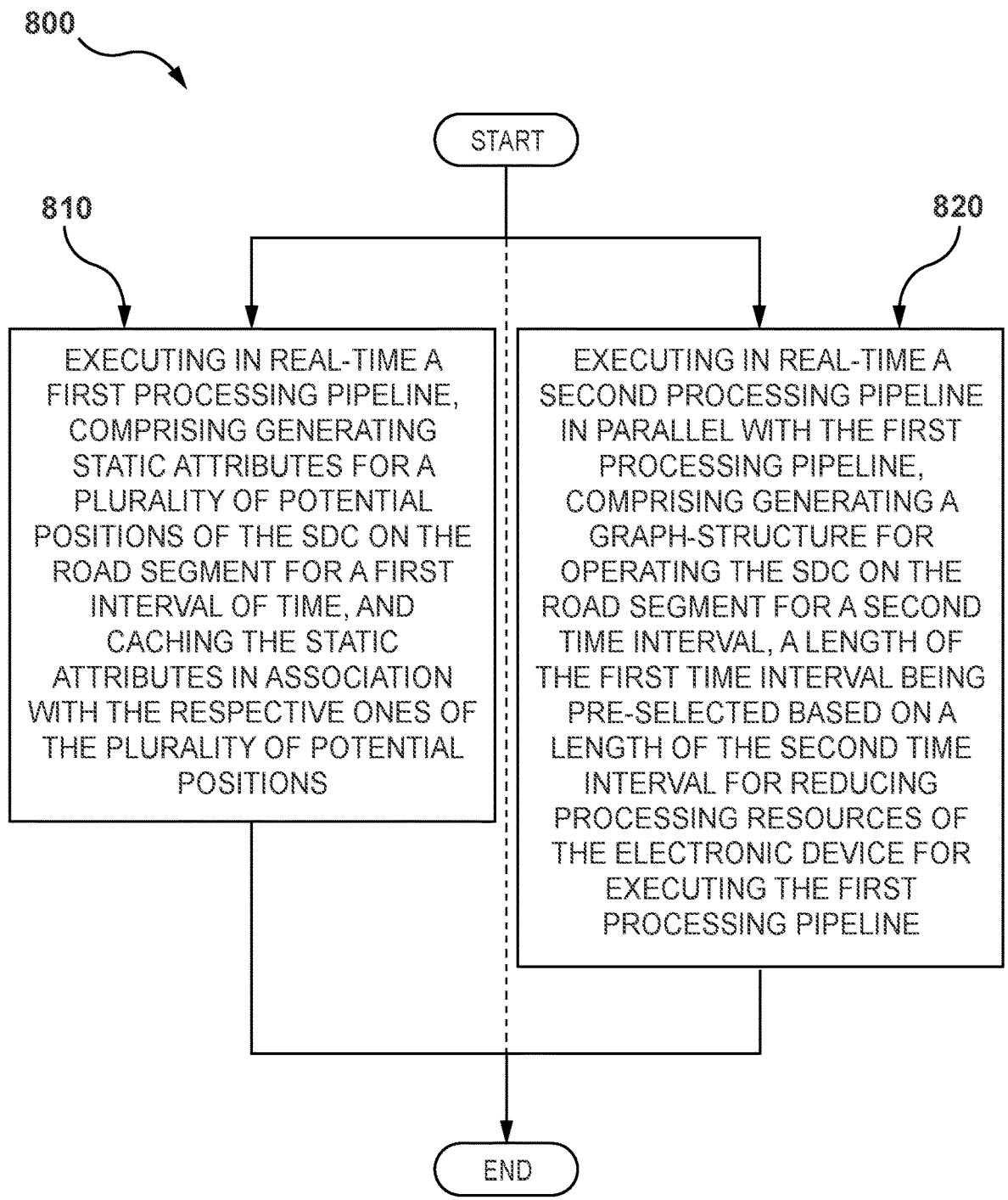
FIG. 8 is a schematic representation of an other method performed by the electronic device in accordance with at least some non-limiting embodiments of the present technology.

With reference to FIG. 8, there is depicted a method 800 that is performed by the electronic device 210 in at least some embodiments of the present technology. It is contemplated that the method 800 may be performed by the electronic device 210 in real-time during operation of the vehicle 220. It is also contemplated that steps of the method 800 may be performed in parallel as will now be discussed in greater details.

STEP 810: Executing in Real-Time a First Processing Pipeline, Comprising Generating Static Attributes for a Plurality of Potential Positions of the SDC on the Road Segment for a First Interval of Time, and Caching the Static Attributes in Association with the Respective Ones of the Plurality of Potential Positions The method 800 has a step 810 during which the electronic device 210 executes, in real-time, a first processing pipeline. In at least some embodiments, it can be said that the first processing pipeline is the support/static processing pipeline described above.

As part of the first processing pipeline, the electronic device 210 is configured to generate static attributes for a plurality of potential positions of the vehicle 220 on the road segment 350. Broadly speaking, a given static attribute is indicative of information about a static object on the road segment 350 relative to a respective potential position associated with a given edge. As part of the first processing pipeline, the electronic device 210 is configured to cache, in a cache memory (the cache 550), the static attributes in association with the respective ones of the plurality of potential positions. The cache 550 may be implanted as hardware component, a software component, and/or a combination of both for storing data so that future requests for that data can be serviced faster. For example, data stored in the cache 550 might be the result of an earlier computation or a copy of data stored elsewhere. It should be noted that generation of the static attributes for the plurality of potential positions of the vehicle 220 on the road segment 350 may be performed for a first time interval.

In some embodiments of the present technology, it is contemplated that the electronic device 210 may be configured to apply a prioritization logic for determining an order of potential positions for which the static attributes are to be generated in the first processing pipeline. For example, the plurality of potential positions for which static attributes are generated may include a pre-selected number of potential positions (top ranked based on the prioritization logic). The caching the static attributes may be triggered once the static attributes are generated for the pre-selected number of potential positions. In another example, the plurality of potential positions for which static attributes are generated may include top ranked potential positions from an order list of potential positions for which the electronic device 210 has enough time to generate static attributes before a pre-determined time limit expires.

In some embodiments, a given static attribute of a respective edge may be one of: a distance between a given one of respective set of intermediate potential positions and a position of a road cone on the road segment, a distance between the given one of the respective set of intermediate potential positions and a position of a stop sign on the road segment, a distance between the given one of the respective set of intermediate potential positions and a position of a lane on the road segment, and a distance between a given one of the respective set of intermediate potential positions and a position of a lane center of the lane on the road segment.

STEP 820: Executing in Real-Time a Second Processing Pipeline in Parallel with the First Processing Pipeline, Comprising Generating a Graph-Structure for Operating the SDC on the Road Segment for a Second Time Interval, a Length of the First Time Interval Being Pre-Selected Based on a Length of the Second Time Interval for Reducing Processing Resources of the Electronic Device for Executing the First Processing Pipeline The method has a step 820 during which the electronic device 210 is configured to execute, in real-time, a second processing pipeline in parallel with the first processing pipeline of the step 810. In at least some embodiments, it can be said that the second processing pipeline is a main/dynamic processing pipeline described above.

It can also be said that steps 810 and 820 of the method 800 can be executed by the electronic device 210 in parallel. In at least some embodiments, the electronic device 210 may be configured to dedicate first processing resources for executing the step 810 and second processing resources for executing the step 820. It is contemplated that the first processing resources may be distinct from the second processing resources.

As part of the second processing pipeline, the electronic device is configured to generate graph-structure for operating the vehicle 220 on the road segment 350. The graph-structure has nodes and edges, and where a given node is associated with a respective potential position of the vehicle 220 on the road segment 350, and where a given edge is representative of a transition of the vehicle 220 between potential positions of the respective pair of nodes. The given edge is associated with a respective set of intermediate potential positions between the potential positions of the respective pair of nodes.

As part of the second processing pipeline, during the generation of the graph-structure, the electronic device 210 is configured to generate dynamic attributes for a given edge of the graph-structure. Broadly speaking, a given dynamic attribute is indicative of information about a moving object on the road segment 350 relative to a respective one of a respective set of intermediate potential positions (and/or potential positions of respective pair of nodes).

The graph-structure may be generated for operating the vehicle during a second time interval. It can be said that the second time interval determines the frequency of computation of dynamic attributes whereas the first time interval from the step 810 determined the frequency of computation of static attributes. It should be noted that length of the first time interval can be pre-selected based on a length of the second time interval (for example, by an operator of the electronic device 210) for reducing processing resources of the electronic device for executing the first processing pipeline.

In some embodiments, the given dynamic attribute of a respective edge may be one of: a distance between a given one of a respective set of intermediate potential positions and a position of an other vehicle on the road segment, a distance between the given one of the respective set of intermediate potential positions and a position of a pedestrian on the road segment, and a distance between the given one of the respective set of intermediate potential positions and a position of a cyclist on the road segment. It is contemplated that generation of static attributes may be performed by the electronic device 210 asynchronously from the generation of dynamic attributes.

As part of the second processing pipeline, during the generation of the graph-structure, the electronic device 210 is configured to acquire from the cache memory static attributes for the given edge of the graph-structure. The static attributes for the given edge include the static attributes cached in association with the respective set of intermediate potential positions and/or potential positions of a respective pair of nodes. The given edge in the graph-structure is thus associated with the static attributes generated by the first processing pipeline and with the dynamic attributes generated by the second processing pipeline.

In further embodiments of the present technology, the graph-structure may be a first graph-structure amongst a plurality of graph-structures to be generated in a periodical manner during operation of the vehicle 220. The electronic device 210 may be configured to use the first graph-structure for operation the vehicle 220 during a first time interval on the road segment 350. In these embodiments, as part of the second processing pipeline, the electronic device 210 may be configured to generate a second graph-structure for operating the vehicle 220 on the road segment 350 during a second time interval. The second graph-structure may share the given edge with the first graph-structure. The generation of the second graph-structure comprises the electronic device 210 configured to generate updated dynamic attributes for the given edge. A given updated dynamic attribute may be indicative of updated information about the moving object on the road segment relative to the respective one of the respective set of intermediate potential positions (and/or potential positions of the respective pair of nodes). The generation of the second graph-structure comprises the electronic device 210 configured to acquiring from the cache memory the static attributes for the given edge, such that the given edge in the second graph-structure is associated with the static attributes generated by the first processing pipeline and with the updated dynamic attributes generated by the second processing pipeline.

In other embodiments, the method 700 may further comprise the electronic device 210 causing operation of the vehicle 220 on the road segment 350 based on the graph-structure. For example, the electronic device 210 may be configured to determine a cost of the given edge in the graph-structure based on the respective static and dynamic attributes. One or more cost criteria as known in the art may be used by the electronic device 210 for determining the cost. The electronic device 210 is also configured to determine a sequence of edges in the graph-structure representative of a potential path for the vehicle 220 on the road segment 350. The sequence of edges includes the given edge and is associated with an acceptable total cost of edges in the sequence. The electronic device 210 is also configured to generate a given trajectory for the vehicle 220 on the road segment 350 based on the sequence of edges. For example, the electronic device 210 may be configured to generate inter alia a speed profile for the vehicle 220 for following the sequence of edges on the road segment 350. The electronic device 210 is also configured to cause operation of the vehicle 220 for travelling on the road segment in accordance with the given trajectory.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. A method of operating a Self-Driving Car (SDC) on a road segment, the SDC travelling on the road segment, the SDC being controlled by an electronic device, the method executable by the electronic device, the method comprising:

executing, in real-time by the electronic device, a first processing pipeline, the executing the first processing pipeline comprising:

applying, by the electronic device, a prioritization logic for determining an order of potential positions for which static attributes are to be generated;

generating, by the electronic device, the static attributes for a plurality of potential positions of the SDC on the road segment,
a given static attribute being indicative of information about a static object on the road segment relative to a respective potential position;

stopping generating, by the electronic device, the static attributes when a pre-selected time limit is reached;

caching, by the electronic device in a cache memory, the static attributes in association with the respective ones of the plurality of potential positions;

executing, in real-time by the electronic device, a second processing pipeline in parallel with the first processing pipeline, the executing the second processing pipeline comprising:
generating, by the electronic device, a graph-structure for operating the SDC on the road segment, the graph-structure having a plurality of nodes and a plurality of edges, each edge connecting two nodes of the plurality of nodes,
each node of the graph-structure being associated with a respective potential position of the SDC on the road segment,
each edge of the graph-structure being representative of a transition of the SDC between potential positions of the two nodes connected by the edge and associated with a respective set of intermediate potential positions between the potential positions of the two nodes,
the generating the graph-structure comprising, for each edge of the plurality of edges of the graph-structure:
generating, by the electronic device, dynamic attributes for a given edge of the graph-structure,
a given dynamic attribute being indicative of information about a moving object on the road segment relative to a respective one of a respective set of intermediate potential positions corresponding to the given edge; and
acquiring, by the electronic device from the cache memory, static attributes for the given edge of the graph-structure,
the static attributes for the given edge including the static attributes cached in association with the respective set of intermediate potential positions corresponding to the given edge;
such that the given edge in the graph-structure is associated with the static attributes generated by the first processing pipeline and with the dynamic attributes generated by the second processing pipeline.

2. The method of claim 1, wherein the graph-structure is a first graph-structure, and wherein the generating the first graph-structure is for operating the SDC on the road segment during a first time interval, and wherein the executing the second processing pipeline further comprises:
generating, by the electronic device, a second graph-structure for operating the SDC on the road segment during a second time interval, the second graph-structure having the given edge of the first graph-structure, the generating the second graph-structure comprising:
generating, by the electronic device, updated dynamic attributes for the given edge,
a given updated dynamic attribute being indicative of updated information about the moving object on the road segment relative to the respective one of the respective set of intermediate potential positions;
acquiring, by the electronic device from the cache memory, the static attributes for the given edge,
such that the given edge in the second graph-structure is associated with the static attributes generated by the first processing pipeline and with the updated dynamic attributes generated by the second processing pipeline.

3. The method of claim 2, wherein the generating the static attributes for the plurality of potential positions of the SDC on the road segment is performed at a first moment in time, and wherein the executing the first processing pipeline further comprises:
generating, by the electronic device, updated static attributes for the plurality of potential positions at a second moment in time, the first moment in time and the second moment in time defining a third time interval, a length of the third time interval being pre-selected based on a length of at least one of the first time interval and the second time interval for reducing processing resources of the electronic device required for executing the first processing pipeline.

4. The method of claim 2, wherein the method further comprises:
causing, by the electronic device, operation of the SDC on the road segment during the second time interval based on the second graph-structure, the causing comprising:
determining, by the electronic device, a cost of the given edge in the second graph-structure based on the respective static and updated dynamic attributes;
determining, by the electronic device, a sequence of edges in the second graph-structure representative of a potential path for the SDC on the road segment, the sequence of edges including the given edge and being associated with an acceptable total cost of edges in the sequence;
generating, by the electronic device, a given trajectory for the SDC on the road segment based on the sequence of edges; and
causing, by the electronic device, operation of the SDC for travelling on the road segment during the second time interval in accordance with the given trajectory.

5. The method of claim 1, wherein the plurality of potential positions includes a pre-selected number of potential positions, and wherein the caching the static attributes is triggered once the static attributes are generated for the pre-selected number of potential positions.

6. The method of claim 1, wherein the generating the static attributes for the plurality of potential positions of the SDC on the road segment of the first processing pipeline is executed asynchronously with the generating the dynamic attributes for the given edge of the graph-structure of the second processing pipeline.

7. The method of claim 1, wherein the given dynamic attribute of the respective edge is one of:
a distance between a given one of the respective set of intermediate potential positions and a position of an other moving vehicle on the road segment;
a distance between the given one of the respective set of intermediate potential positions and a position of a moving pedestrian on the road segment; and
a distance between the given one of the respective set of intermediate potential positions and a position of a moving cyclist on the road segment.

8. The method of claim 1, wherein the given static attribute of the respective edge is one of:
- a distance between a given one of the respective set of intermediate potential positions and a position of a road cone on the road segment;
- a distance between the given one of the respective set of intermediate potential positions and a position of a stop sign on the road segment;
- a distance between the given one of the respective set of intermediate potential positions and a position of a lane on the road segment; and
- a distance between a given one of the respective set of intermediate potential positions and a position of a lane center of the lane on the road segment.

9. The method of claim 1, wherein the method further comprises:
- causing, by the electronic device, operation of the SDC on the road segment based on the graph-structure, the causing comprising:
  - determining, by the electronic device, a cost of the given edge in the graph-structure based on the respective static and dynamic attributes;
  - determining, by the electronic device, a sequence of edges in the graph-structure representative of a potential path for the SDC on the road segment, the sequence of edges including the given edge and being associated with an acceptable total cost of edges in the sequence;
  - generating, by the electronic device, a given trajectory for the SDC on the road segment based on the sequence of edges; and
  - causing, by the electronic device, operation of the SDC for travelling on the road segment in accordance with the given trajectory.

10. A method of operating a Self-Driving Car (SDC) on a road segment, the SDC travelling on the road segment, the SDC being controlled by an electronic device, the method executable by the electronic device, the method comprising:
- executing, in real-time by the electronic device, a first processing pipeline, the executing the first processing pipeline comprising:
  - applying, by the electronic device, a prioritization logic for determining an order of potential positions for which static attributes are to be generated;
  - generating, by the electronic device, the static attributes for a plurality of potential positions of the SDC on the road segment for a first time interval,
    - a given static attribute being indicative of information about a static object on the road segment relative to a respective potential position;
  - stopping generating, by the electronic device, the static attributes when a pre-selected time limit is reached;
  - caching, by the electronic device in a cache memory, the static attributes in association with the respective ones of the plurality of potential positions;
- executing, in real-time by the electronic device, a second processing pipeline in parallel with the first processing pipeline, the executing the second processing pipeline comprising:
  - generating, by the electronic device, a graph-structure for operating the SDC on the road segment during a second time interval, the graph-structure having a plurality of nodes and a plurality of edges, each edge connecting two nodes of the plurality of nodes,
    - each node of the graph-structure being associated with a respective potential position of the SDC on the road segment,
    - each edge of the graph-structure being representative of a transition of the SDC between potential positions of two nodes connected by the edge and associated with a respective set of intermediate potential positions between the potential positions of the two nodes,
  - the generating the graph-structure comprising, for each edge of the plurality of edges of the graph-structure:
    - generating, by the electronic device, dynamic attributes for a given edge of the plurality of edges of the graph-structure,
      - a given dynamic attribute being indicative of information about a moving object on the road segment relative to a respective one of a respective set of intermediate potential positions corresponding to the given edge; and
    - acquiring, by the electronic device from the cache memory, static attributes for the given edge of the plurality of edges of the graph-structure,
      - the static attributes for the given edge including static attributes cached in association with the respective set of intermediate potential positions;
- a length of the first time interval being pre-selected based on a length of the second time interval for reducing processing resources of the electronic device for executing the first processing pipeline.

11. An electronic device for operating a Self-Driving Car (SDC) on a road segment, the SDC travelling on the road segment, the electronic device including at least one processor, a cache memory, and a non-volatile memory storing executable instructions which, when executed by the at least one processor, cause the electronic device to:
- execute, in real-time, a first processing pipeline, the first processing pipeline comprising:
  - applying a prioritization logic for determining an order of potential positions for which static attributes are to be generated;
  - generating the static attributes for a plurality of potential positions of the SDC on the road segment,
    - a given static attribute being indicative of information about a static object on the road segment relative to a respective potential position;
  - stopping generating the static attributes when a pre-selected time limit is reached;
  - caching, in the cache memory, the static attributes in association with the respective ones of the plurality of potential positions;
- execute, in real-time, a second processing pipeline in parallel with the first processing pipeline, the second processing pipeline comprising:
  - generating a graph-structure for operating the SDC on the road segment, the graph-structure having a plurality of nodes and a plurality of edges, each edge connecting two nodes of the plurality of nodes,
    - each node of the plurality of nodes being associated with a respective potential position of the SDC on the road segment,
    - each edge of the plurality of edges being representative of a transition of the SDC between potential positions of the two nodes connected by the edge and associated with a respective set of intermediate potential positions between the potential positions of the two nodes,
  - wherein generating the graph-structure comprises, for each edge of the plurality of edges of the graph-structure:

generating dynamic attributes for a given edge of the graph-structure,
   a given dynamic attribute being indicative of information about a moving object on the road segment relative to a respective one of a respective set of intermediate potential positions corresponding to the given edge;
acquiring from the cache memory, static attributes for the given edge of the graph-structure,
   the static attributes for the given edge including the static attributes cached in association with the respective set of intermediate potential positions corresponding to the given edge;
such that the given edge in the graph-structure is associated with the static attributes generated by the first processing pipeline and with the dynamic attributes generated by the second processing pipeline.

12. The electronic device of claim 11, wherein the graph-structure is a first graph-structure, and wherein the first graph-structure is for operating the SDC on the road segment during a first time interval, and wherein executing the second processing pipeline comprises:
generating a second graph-structure for operating the SDC on the road segment during a second time interval, the second graph-structure having the given edge of the first graph-structure,
generating the second graph-structure comprising:
   generating updated dynamic attributes for the given edge,
      a given updated dynamic attribute being indicative of updated information about the moving object on the road segment relative to the respective one of the respective set of intermediate potential positions;
   acquiring, from the cache memory, the static attributes for the given edge,
   such that the given edge in the second graph-structure is associated with the static attributes generated by the first processing pipeline and with the updated dynamic attributes generated by the second processing pipeline.

13. The electronic device of claim 12, wherein generating the static attributes for the plurality of potential positions of the SDC on the road segment is performed at a first moment in time, and executing the first processing pipeline comprises:
generating updated static attributes for the plurality of potential positions at a second moment in time, the first moment in time and the second moment in time defining a third time interval,
   a length of the third time interval being pre-selected based on a length of at least one of the first time interval and the second time interval for reducing processing resources of the electronic device required for executing the first processing pipeline.

14. The electronic device of claim 12, wherein the executable instructions further cause the electronic device to:
cause operation of the SDC on the road segment during the second time interval based on the second graph-structure by:
   determining a cost of the given edge in the second graph-structure based on the respective static and updated dynamic attributes;
   determining a sequence of edges in the second graph-structure representative of a potential path for the SDC on the road segment,
      the sequence of edges including the given edge and being associated with an acceptable total cost of edges in the sequence;
   generating a given trajectory for the SDC on the road segment based on the sequence of edges; and
   causing operation of the SDC for travelling on the road segment during the second time interval in accordance with the given trajectory.

15. The electronic device of claim 11, wherein the generating the static attributes for the plurality of potential positions of the SDC on the road segment of the first processing pipeline is executed asynchronously from the generating the dynamic attributes for the given edge of the graph-structure of the second processing pipeline.

16. The electronic device of claim 11, wherein the given dynamic attribute of the respective edge is one of:
   a distance between a given one of the respective set of intermediate potential positions and a position of an other moving vehicle on the road segment;
   a distance between the given one of the respective set of intermediate potential positions and a position of a moving pedestrian on the road segment; and
   a distance between the given one of the respective set of intermediate potential positions and a position of a moving cyclist on the road segment.

17. The electronic device of claim 11, wherein the given static attribute of the respective edge is one of:
   a distance between a given one of the respective set of intermediate potential positions and a position of a road cone on the road segment;
   a distance between the given one of the respective set of intermediate potential positions and a position of a stop sign on the road segment;
   a distance between the given one of the respective set of intermediate potential positions and a position of a lane on the road segment; and
   a distance between a given one of the respective set of intermediate potential positions and a position of a lane center of the lane on the road segment.

18. The electronic device of claim 11, wherein the executable instructions further cause the electronic device to:
cause operation of the SDC on the road segment based on the graph-structureby:
   determining a cost of the given edge in the graph-structure based on the respective static and dynamic attributes;
   determining a sequence of edges in the graph-structure representative of a potential path for the SDC on the road segment,
      the sequence of edges including the given edge and being associated with an acceptable total cost of edges in the sequence;
   generating a given trajectory for the SDC on the road segment based on the sequence of edges; and
   causing operation of the SDC for travelling on the road segment in accordance with the given trajectory.

* * * * *